(12) United States Patent
Neelakantan et al.

(10) Patent No.: US 9,435,428 B2
(45) Date of Patent: Sep. 6, 2016

(54) ELECTRONIC TRANSMISSION RANGE SELECTION SUBSYSTEM IN A HYDRAULIC CONTROL SYSTEM FOR AN AUTOMATIC TRANSMISSION

(71) Applicant: GM Global Technology Operations LLC, Detroit, MI (US)

(72) Inventors: Vijay A. Neelakantan, Rochester Hills, MI (US); Joshua McDonough, Novi, MI (US); Philip C. Lundberg, Keego Harbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/944,895

(22) Filed: Nov. 18, 2015

(65) Prior Publication Data

US 2016/0169375 A1 Jun. 16, 2016

Related U.S. Application Data

(60) Provisional application No. 62/090,563, filed on Dec. 11, 2014.

(51) Int. Cl.
| | |
|---|---|
| *F16H 61/26* | (2006.01) |
| *F16H 61/02* | (2006.01) |
| *F16H 61/00* | (2006.01) |
| *F16H 61/22* | (2006.01) |

(52) U.S. Cl.
CPC ...... *F16H 61/0267* (2013.01); *F16H 61/0021* (2013.01); *F16H 61/22* (2013.01)

(58) Field of Classification Search
CPC ............... F16H 61/0021; F16H 61/66272; F16H 61/14; F16H 61/66259; F16H 63/3483
See application file for complete search history.

(56) References Cited

U.S. PATENT DOCUMENTS

| | | | | |
|---|---|---|---|---|
| 6,701,797 | B2 * | 3/2004 | Heuver | B60T 1/005 192/219.5 |
| 6,983,668 | B2 * | 1/2006 | Powell | F16H 63/3483 74/335 |
| 7,139,652 | B2 * | 11/2006 | Kikuchi | B60K 37/06 701/51 |
| 7,270,027 | B2 | 9/2007 | Berger et al. | |
| 7,862,471 | B2 * | 1/2011 | Koski | F16H 61/0251 477/72 |

(Continued)

OTHER PUBLICATIONS

U.S. Appl. No. 14/816,716, filed Mar. 3, 2015 by Joshua J. McDonough et al. All pages.

(Continued)

*Primary Examiner* — David J Hlavka (57) ABSTRACT

A hydraulic control system for a transmission is provided. The hydraulic control system includes a source of pressurized hydraulic fluid that communicates with an electronic transmission range selection (ETRS) subsystem. In one example, the ETRS subsystem includes an ETRS enablement valve, an ETRS control valve, a park servo that controls a park mechanism, a plurality of solenoids, and a park inhibit solenoid assembly.

20 Claims, 6 Drawing Sheets

(56) References Cited

U.S. PATENT DOCUMENTS

| | | | |
|---|---|---|---|
| 8,435,148 B2 | 5/2013 | Moorman | |
| 8,894,545 B2 | 11/2014 | Berger | |
| 8,932,167 B2 | 1/2015 | Berger | |
| 9,194,465 B2* | 11/2015 | Lundberg | F16H 9/125 |
| 2002/0082131 A1* | 6/2002 | Park | F16H 57/04 |
| | | | 475/127 |
| 2009/0069131 A1* | 3/2009 | Soga | F16H 61/66272 |
| | | | 474/18 |
| 2011/0247443 A1* | 10/2011 | Shimizu | F16H 61/0021 |
| | | | 74/473.11 |
| 2013/0174722 A1* | 7/2013 | Schmidt | F15B 15/26 |
| | | | 91/45 |
| 2013/0319156 A1* | 12/2013 | Berger | F16H 59/08 |
| | | | 74/473.11 |
| 2014/0123799 A1 | 5/2014 | Landino et al. | |
| 2014/0216885 A1* | 8/2014 | Heuver | B60T 1/005 |
| | | | 192/219.4 |
| 2014/0360302 A1 | 12/2014 | Lundberg | |
| 2015/0129385 A1* | 5/2015 | Lundberg | F16H 61/30 |
| | | | 192/3.57 |
| 2016/0069451 A1* | 3/2016 | McDonough | F16H 61/0021 |
| | | | 74/473.11 |

OTHER PUBLICATIONS

U.S. Appl. No. 14/570,329, filed Dec. 15, 2014 by Vijay A. Neelakantan et al. All pages.

U.S. Appl. No. 14/517,074, filed Oct. 17, 2014, by Philip C. Lundberg et al. All pages.

* cited by examiner

| Park-Run | Pump | ETRS Enable Solenoid | ETRS Control Solenoid | ETRS Enable Valve | ETRS Control Valve | Enable Oil | OOP Oil/Latch | RTP Oil | PISA |
|---|---|---|---|---|---|---|---|---|---|
| Hydraulic | 1 | 0 | 0 | 0 | 0 | 0 | 0 | 0 | 0 |
| Electrical | 1 | 1 | 0 | – | – | – | – | – | 0 |

| OOP | Pump | ETRS Enable Solenoid | ETRS Control Solenoid | ETRS Enable Valve | ETRS Control Valve | Enable Oil | OOP Oil/Latch | RTP Oil | PISA |
|---|---|---|---|---|---|---|---|---|---|
| Hydraulic | 1 | 1 | 1 | 1 | 1 | 1 | 1 | 0 | 1 |
| Electrical | 1 | 0 | 1 | – | – | – | – | – | 1 |

| OOP Latch | Pump | ETRS Enable Solenoid | ETRS Control Solenoid | ETRS Enable Valve | ETRS Control Valve | Enable Oil | OOP Oil/Latch | RTP Oil | PISA |
|---|---|---|---|---|---|---|---|---|---|
| Hydraulic | 1 | 1 | 0 | 1 | 1 | 1 | 1 | 0 | 1 |
| Electrical | 1 | 0 | 0 | - | - | - | - | - | 1 |

Fig-4B

| OOP Acc | Pump | ETRS Enable Solenoid | ETRS Control Solenoid | ETRS Enable Valve | ETRS Control Valve | Enable Oil | OOP Oil/Latch | RTP Oil | PISA |
|---|---|---|---|---|---|---|---|---|---|
| Hydraulic | 0 | 0 | 0 | 0 | 0 | 0 | 0 | 0 | 1 |
| Electrical | 0 | 1 | 0 | – | – | – | – | – | 1 |

| RTP | Pump | ETRS Enable Solenoid | ETRS Control Solenoid | ETRS Enable Valve | ETRS Control Valve | Enable Oil | OOP Oil/Latch | RTP Oil | PISA |
|---|---|---|---|---|---|---|---|---|---|
| Hydraulic | 1 | 1 | 0 | 1 | 0 | 1 | 0 | 1 | 0 |
| Electrical | 1 | 0 | 1 | - | - | - | - | - | 0 |

Fig-5B

ELECTRONIC TRANSMISSION RANGE SELECTION SUBSYSTEM IN A HYDRAULIC CONTROL SYSTEM FOR AN AUTOMATIC TRANSMISSION

CROSS REFERENCE TO RELATED APPLICATIONS

This application claims benefit of U.S. Provisional Application No. 62/090,563 filed Dec. 11, 2014. The disclosure of the above application is incorporated herein.

TECHNICAL FIELD

The invention relates to a hydraulic control system for an automatic transmission, and more particularly to an electronic transmission range selection subsystem in a hydraulic control system for an automatic transmission.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

While previous ETRS subsystems are useful for their intended purpose, the need for new and improved hydraulic control system configurations within transmissions which exhibit improved performance, especially from the standpoints of efficiency, responsiveness and smoothness, is essentially constant. These control systems must also meet specific safety requirements for new transmission and vehicle designs during particular failure modes of operation.

Accordingly, there is a need for an improved, cost-effective ETRS subsystem within a hydraulic control system for use in a hydraulically actuated automatic transmission.

SUMMARY

A hydraulic control system for a transmission is provided. The hydraulic control system includes a source of pressurized hydraulic fluid that communicates with an electronic transmission range selection (ETRS) subsystem. In one example, the ETRS subsystem includes an ETRS control valve, an ETRS enable valve, a park servo that controls a park mechanism, a plurality of solenoids, and a park inhibit solenoid assembly.

For example, a hydraulic control system includes a pressure regulator subsystem for providing a pressurized hydraulic fluid, an enablement valve assembly connected directly downstream of the pressure regulator subsystem and configured to selectively allow pressurized hydraulic fluid to communicate through the enablement valve assembly, a control valve assembly connected directly downstream of the enablement valve assembly and configured to selectively communicate the pressurized hydraulic fluid to one of a first port and a second port, a park servo assembly connected directly downstream to the first port and the second port of the control valve assembly and configured to control a park mechanism, a first solenoid configured to control the enablement valve assembly, and a second solenoid configured to control the control valve assembly.

In one aspect, the first port of the control valve assembly is connected to an out of park port in the park servo assembly and the second port of the control valve assembly is connected to a return to park port in the park servo assembly.

In another aspect, the park servo assembly includes a park piston mechanically connected to a park mechanism, wherein the park piston is moveable between an out-of-park position and a park position, and wherein the out of park port communicates with an opposite side of the park piston than the return to park port.

In another aspect, a first position sensor detects an operating state of the control valve assembly.

In another aspect, a second position sensor detects an operating state of the park servo assembly.

In another aspect, the first solenoid is a normally high, on/off solenoid.

In another aspect, the second solenoid is a normally low, on/off solenoid.

In another aspect, a park inhibit solenoid assembly is configured to latch the park servo assembly in an out of park position.

In another aspect, the control valve assembly includes a shuttle valve and a control valve biased to a park position by a spring.

In another aspect, the second solenoid communicates with the shuttle valve to move the shuttle valve and the control valve against the bias of the spring to an out of park position.

In another aspect, the enablement valve assembly includes an enablement valve biased to a disable position by a spring.

In another aspect, the first solenoid communicates with the enablement valve to move the enablement valve against the bias of the spring to an enabled position.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
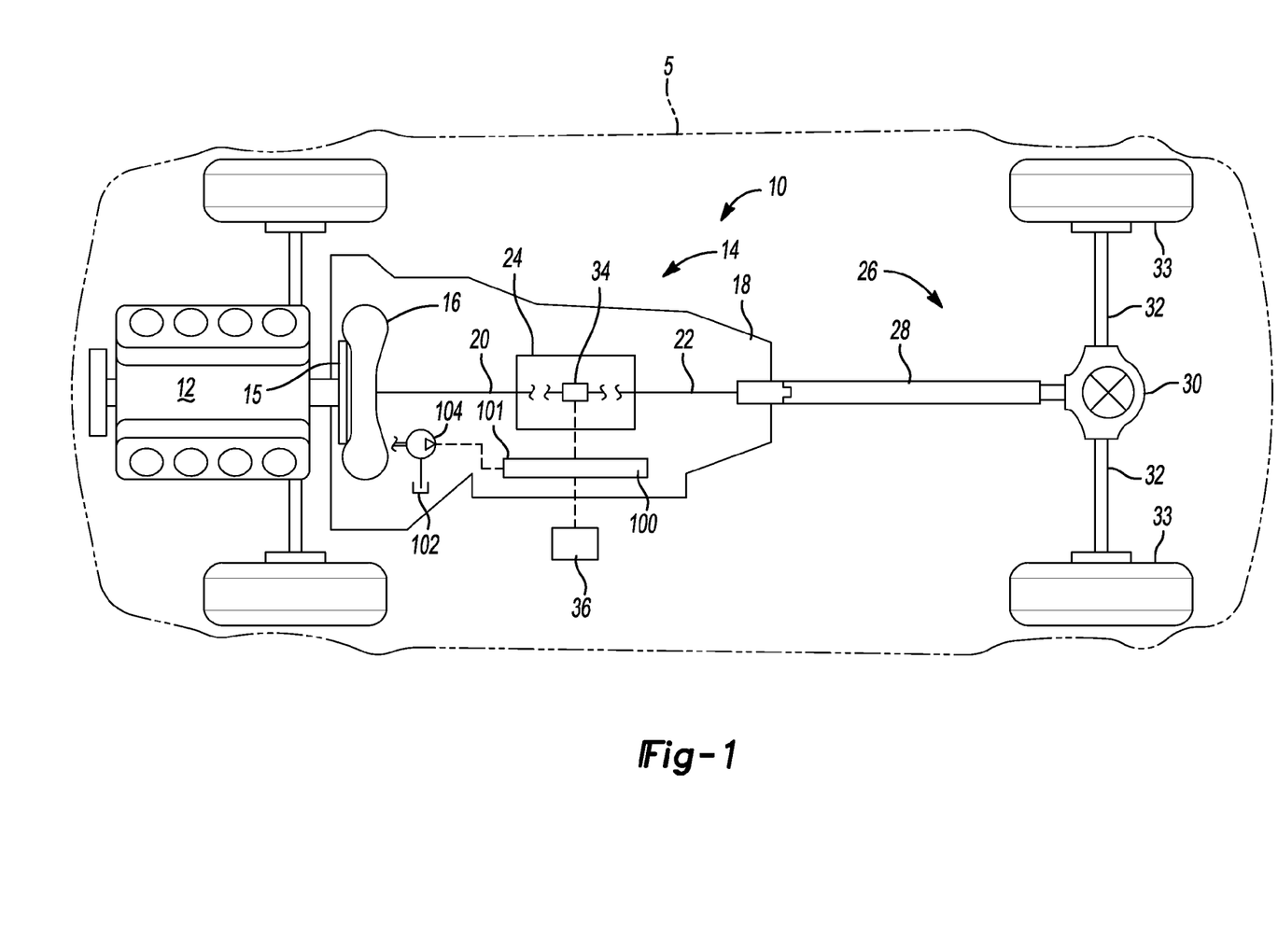
FIG. 1 is a is a schematic diagram of an exemplary powertrain in a motor vehicle.

With reference to FIG. 1, a motor vehicle is illustrated and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed including a dry launch clutch.

The transmission 14 has a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The transmission 18 includes a transmission control module 36. The transmission control module 36 is preferably an electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 36 controls the actuation of the clutches/brakes 34 via a hydraulic control system 100. In another example, the transmission control module 36 is an engine control module (ECM), or a hybrid control module, or any other type of controller.

The hydraulic control system 100 is disposed within a valve body 101 that contains and houses via fluid paths and valve bores most of the components of the hydraulic control system 100. These components include, but are not limited to, pressure regulation valves, directional valves, solenoids, etc. The valve body 101 may be attached to a bottom of the transmission housing 18 in rear-wheel drive transmissions or attached to a front of the transmission housing 18 in front-wheel drive transmissions. The hydraulic control system 100 is operable to selectively engage the clutches/brakes 34 and to provide cooling and lubrication to the transmission 14 by selectively communicating a hydraulic fluid from a sump 102 under pressure from either an engine driven pump 104 or an accumulator (not shown). The pump 104 may be driven by the engine 12 or by an auxiliary engine or electric motor.

With combined reference to FIGS. 2A, 3A, 4A, and 5A, a portion of the hydraulic control system 100 is illustrated. The hydraulic control system 100 generally includes a plurality of interconnected or hydraulically communicating subsystems including a pressure regulator subsystem 106, an actuator feed subsystem 108, and an electronic transmission range selection (ETRS) control subsystem 110. The hydraulic control system 100 may also include various other subsystems or modules, such as a lubrication subsystem, a clutch control and/or ratio control subsystem, a torque converter clutch subsystem, and/or a cooling subsystem, without departing from the scope of the present invention.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 18 to which the hydraulic fluid returns and collects from various components and regions of the transmission. The hydraulic fluid is forced from the sump 102 and communicated throughout the hydraulic control system 100 via the pump 104. The pump 104 may be, for example, a gear pump, a vane pump, a gerotor pump, or any other positive displacement pump. The pressure regulator subsystem 106 may also include an alternate source of hydraulic fluid that includes an auxiliary pump (not shown) preferably driven by an electric engine, battery, or other prime mover (not shown), or an accumulator. The hydraulic fluid from the pump 104 is controlled by a pressure regulator valve 112. The pressure regulator valve 112 regulates the pressure of the hydraulic fluid from the pump 104 and feeds pressurized hydraulic fluid at line pressure to a main supply line 114. The main supply line 114 may include other branches and feed other subsystems, including the actuator feed subsystem 108, without departing from the scope of the present invention. The pressure regulator subsystem 106 may also include various other valves and solenoids without departing from the scope of the present invention.

The actuator feed subsystem 108 provides hydraulic fluid to various control devices or actuators, such as solenoids, throughout the hydraulic control system 100. The actuator feed subsystem 108 includes a feed limit valve 115 that controls or limits the pressure of hydraulic fluid supplied to the actuators.

The ETRS control subsystem 110 converts electronic input for a requested range selection (Drive, Reverse, Park) into hydraulic and mechanical commands. The hydraulic commands use line pressure hydraulic fluid from the pressure regulator subsystem 106 via main supply line 114 to supply hydraulic fluid to a park servo mechanism 116. The mechanical commands include engaging and disengaging a park mechanism 117. The park mechanism 117 may be a conventional park mechanism that limits rotation of the transmission output shaft 22 or any other type of vehicle motion arresting system. The ETRS control subsystem 110 further includes an enablement valve assembly 118, a control valve assembly 120, a first control device 122, a second control device 124, and a park inhibit solenoid assembly 126.

Figure 2A:
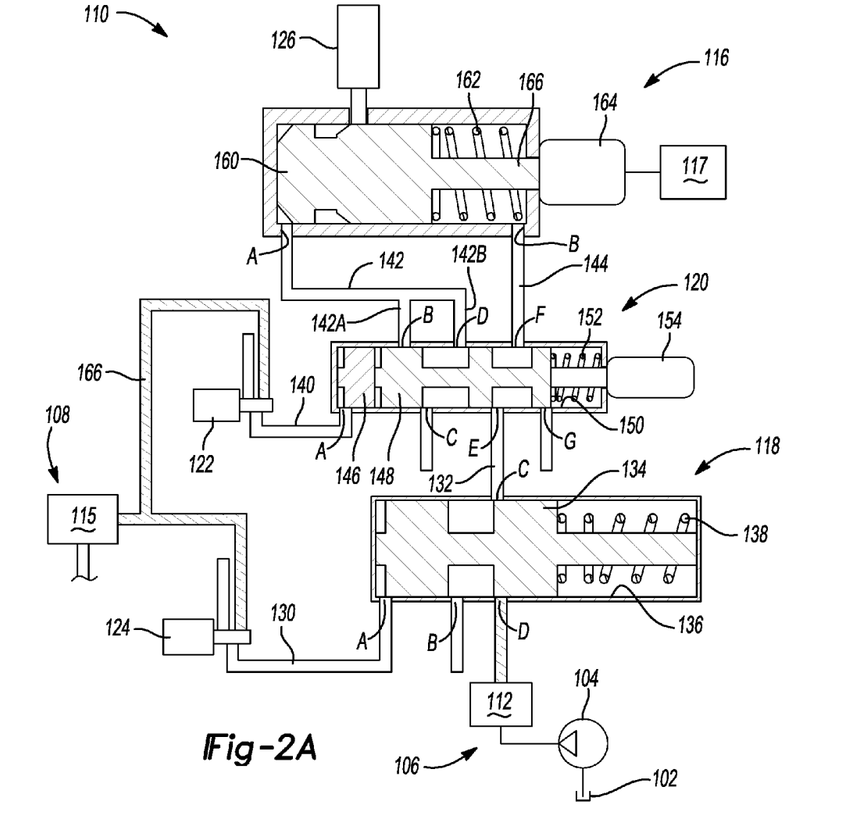
FIG. 2A is a diagram of a portion of a hydraulic control system according to the principles of the present invention in a first operating mode.

The enablement valve assembly 118 includes ports 118A-D, numbered consecutively from left to right in FIG. 2A. Port 118A is connected to, or in fluid communication with, the second control device 124 via a feed line 130. Port 118B is an exhaust port that communicates with the sump 102 or an exhaust backfill circuit (not shown). Port 118C is connected to an intermediate feed line 132. Port 118D is connected to the main feed line 114.

The enablement valve assembly 118 further includes a spool valve 134 slidably disposed within a bore 136 formed in the valve body 101. The spool valve 134 is moveable between an enable position, illustrated in FIGS. 3A, 4A, 5A, and a disable position, illustrated in FIG. 2A. A biasing member 138, such as a coiled spring, biases the spool valve 134 to the disable position. In the enable position (shown in FIGS. 3A, 4A, 5A) fluid port 118D communicates with fluid port 118C and fluid port 118B is closed. In the disable position (shown in FIG. 2A) fluid port 118C exhausts through exhaust port 118B and fluid port 118D is closed.

The control valve assembly 120 includes ports 120A-G, numbered consecutively from left to right in FIG. 2A. Port 120A is connected to the first control device 122 via a feed line 140. Port 120B is connected to the park servo 116 via a branch 142A of an out-of-park feed line 142. Ports 120C and 120G are exhaust ports that communicate with the sump 102 or an exhaust backfill circuit (not shown). Port 120D is connected to the park servo 116 via a second branch 142B of the out-of-park feed line 142. Port 120E is connected to the intermediate feed line 132. Port 120F is connected to the park servo 116 by a return to park feed line 144.

The control valve assembly 120 further includes a shuttle valve 146 and a main spool valve 148 each slidably disposed within a bore 150 formed in the valve body 101. The shuttle valve 146 is moveable between an engaged position, illustrated in FIG. 3A, and a disengaged position, illustrated in FIGS. 2A, 4A, and 5A. The main spool valve 148 is moveable between a park position, illustrated in FIGS. 2A and 5A, and an out-of-park position, illustrated in FIGS. 3A and 4A. A biasing member 150, such as a coiled spring, biases the main spool valve 148 to the park position. In the park position (shown in FIGS. 2A, 5A), fluid port 120D exhausts through exhaust port 120C and fluid port 120E communicates with fluid port 120F. In the out-of-park position (shown in FIGS. 3A, 4A, fluid port 120E communicates with fluid port 120D, fluid port 120F exhausts through exhaust port 120G, and fluid port 120B communicates with an end of the main spool valve 148.

A park position switch or sensor 154 is disposed proximate the main spool valve 148 and is operable to detect the position of the main spool valve 148. The park position sensor 154 may be a hall-effect sensor or any other type of sensor or switch without departing from the scope of the present invention. The park position sensor 154 communicates with the transmission control module 36 and is used in diagnostics.

The park servo assembly 116 includes ports 116A and 116B each located on either side of a piston 160. Port 116A communicates with the out-of-park fluid line 142. Port 116B communicates with the park feed line 144. The piston 160 is mechanically coupled to the park system 117. The piston 160 is moveable between a park position, shown in FIGS. 2A and 5A, and an out-of-park position, shown in FIGS. 3A and 4A. A biasing member 162, such as a spring, biases the piston 160 to the park position. In the park position, the piston 150 engages the park assembly 118 placing the motor vehicle 5 in a park mode of operation where the transmission output shaft 22 is mechanically locked from rotation. Hydraulic fluid supplied to fluid port 116A moves the piston 150 against the force of the biasing member 152 to move the piston 150 to the out-of-park position. Hydraulic fluid may be optionally supplied to the fluid port 116B to help move the piston 150 to the park position.

A park servo position switch or sensor 164 is disposed proximate a stem 166 connected to the piston 160 and is operable to detect the position of the piston 160. The park servo position sensor 164 may be a hall-effect sensor or any other type of sensor or switch without departing from the scope of the present invention. The park servo position sensor 164 communicates with the transmission control module 36 and is used in diagnostics.

The first control device 122 is configured to move the shuttle valve 146 to the engaged position and thereby the man spool valve 148 to the out-of-park position by selectively communicating pressurized hydraulic fluid from the actuator feed subsystem 108, via an actuator line 166, to the valve feed line 140. The first control device 122 is preferably a normally low, on/off solenoid. The first control device 122 is in electrical communication with the transmission control module 36.

The second control device 124 is configured to move the spool valve 134 of the enablement valve assembly 118 to the enablement position by selectively communicating pressurized hydraulic fluid from the actuator feed subsystem 108, via the actuator line 166, to the valve feed line 130. The second control device 124 is preferably a normally high, on/off solenoid. The second control device 124 is in electrical communication with the transmission control module 36.

The park inhibit solenoid 126 is connected to the park servo assembly 116. When activated, the park inhibit solenoid 126 mechanically engages the piston 160 to keep the piston 160 in the out-of-park position. The park inhibit solenoid 126 is in electrical communication with the transmission control module 36.

Figure 2B:
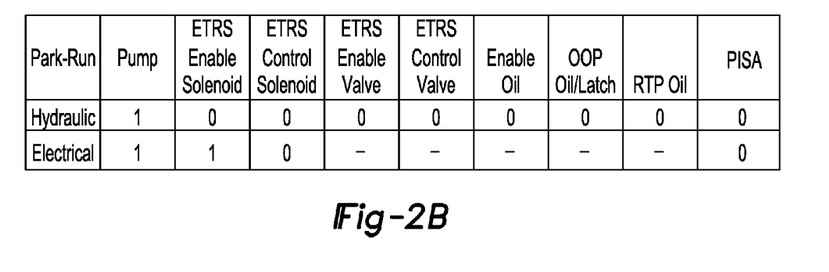
FIG. 2B is a table showing the operating state of components of the powertrain when in the first operating mode.

FIG. 2A shows the ETRS subsystem 110 in a park mode of operation and FIG. 2B presents a table indicating the on/off state or engagement/disengagement of various components of the powertrain 10 in the park mode. In FIG. 2B, a "0" indicates an off state or a disengaged state and a "1" indicates an on state or an engaged state. In the park state, the devices 122, 124 are closed and the biasing member 138 moves the enablement spool valve 134 to the disable position cutting off fluid from the main supply line 114 to the ETRS subsystem 110. Biasing members 152, 166 bias the main spool valve 148 and park piston 160 to the park positions, thereby engaging the park mechanism 117.

Figure 3A:
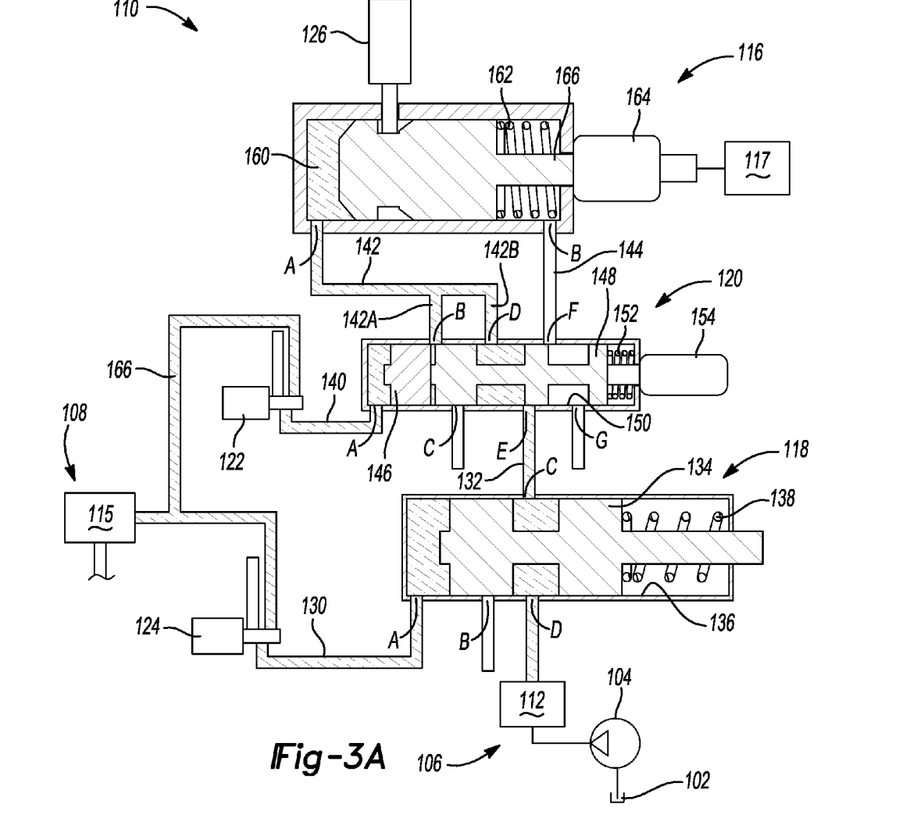
FIG. 3A is a diagram of a portion of a hydraulic control system according to the principles of the present invention in a second operating mode.
Figure 3B:
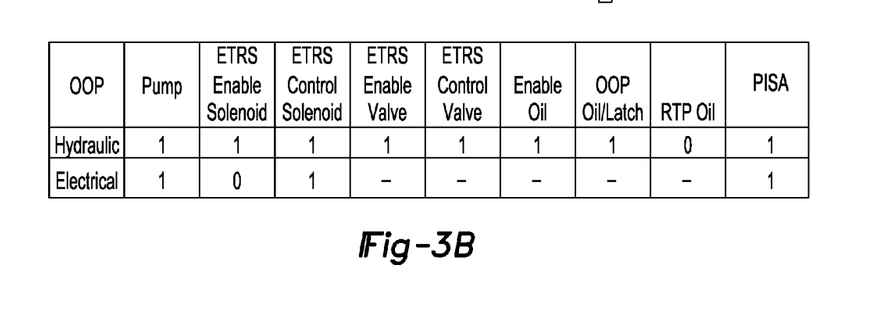
FIG. 3B is a table showing the operating state of components of the powertrain when in the second operating mode.

FIG. 3A shows the ETRS subsystem 110 in an out-of-park mode of operation and FIG. 3B presents a table indicating the on/off state or engagement/disengagement of various components of the powertrain 10 in the out-of-park mode. In FIG. 3B, a "0" indicates an off state or a disengaged state and a "1" indicates an on state or an engaged state. In the out-of-park state, the control devices 122, 124 are opened and the enablement valve spool 134 is moved to the enable position and the shuttle 146 is moved to the engaged position thereby moving the main spool valve 148 to the out-of-park position. Pressurized hydraulic fluid communicates from the main supply line 114 through the enablement valve assembly 116, through the control valve assembly 120 to the fluid port 116A of the park servo 116 via the out-of-park fluid line 142. This pressurized hydraulic fluid moves the piston 160 to the out-of-park position.

Figure 4A:
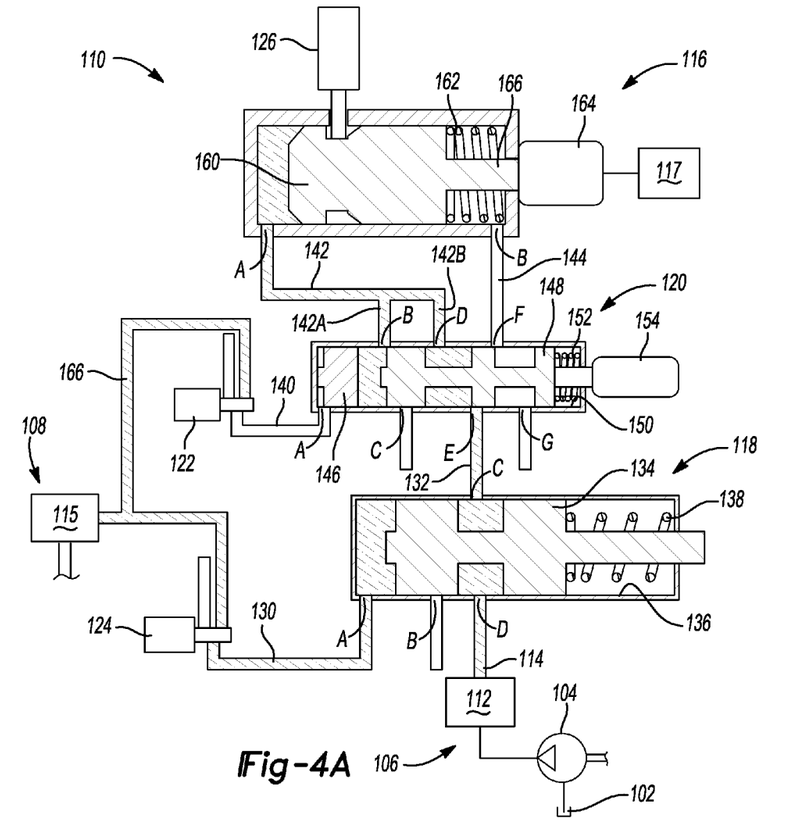
FIG. 4A is a diagram of a portion of a hydraulic control system according to the principles of the present invention in a third operating mode.
Figure 4B:
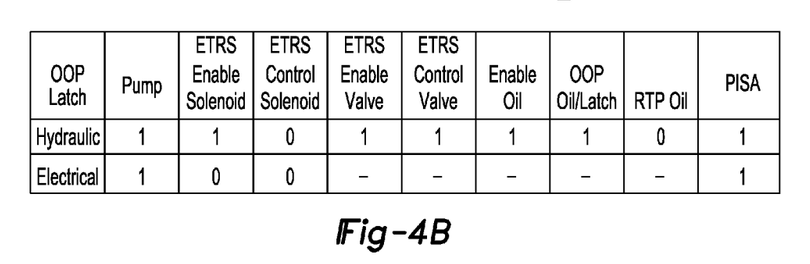
FIG. 4B is a table showing the operating state of components of the powertrain when in the third operating mode.

FIG. 4A shows the ETRS subsystem 110 in a latched out-of-park mode of operation and FIG. 4B presents a table indicating the on/off state or engagement/disengagement of various components of the powertrain 10 in the latched out-of-park mode. In FIG. 4B, a "0" indicates an off state or a disengaged state and a "1" indicates an on state or an engaged state. In the latched out-of-park state, the first control device 122 is closed, either due to a failure in the first control device 122 or the transmission control module 36. In this state, pressurized hydraulic fluid from the main supply line 114 is fed back into the control valve assembly 120 via the first branch 142A of the out-of-park feed line 142. This pressurized hydraulic fluid acts on an end of the main spool valve 148 and latches the main spool valve 148 to the out-of-park position.

Figure 4C:
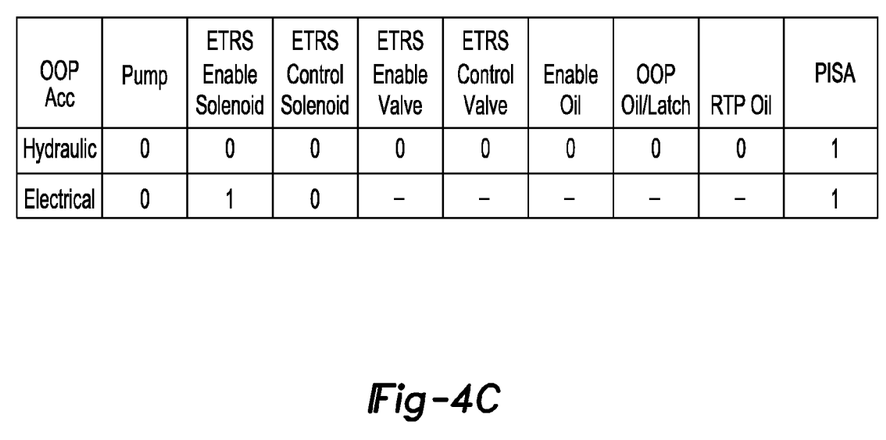
FIG. 4C is a table showing the operating state of components of the powertrain when in a fourth operating mode.

FIG. 4C presents a table indicating the on/off state or engagement/disengagement of various components of the powertrain 10 in an out-of-park mode where there is no power or hydraulic fluid supplied to the ETRS subsystem 110, for example when in Neutral at a car wash. In FIG. 4B, a "0" indicates an off state or a disengaged state and a "1" indicates an on state or an engaged state. In this modified out-of-park state, the park inhibit solenoid assembly 126 is engaged and keeps the park servo 116 in the out-of-park position.

Figure 5A:
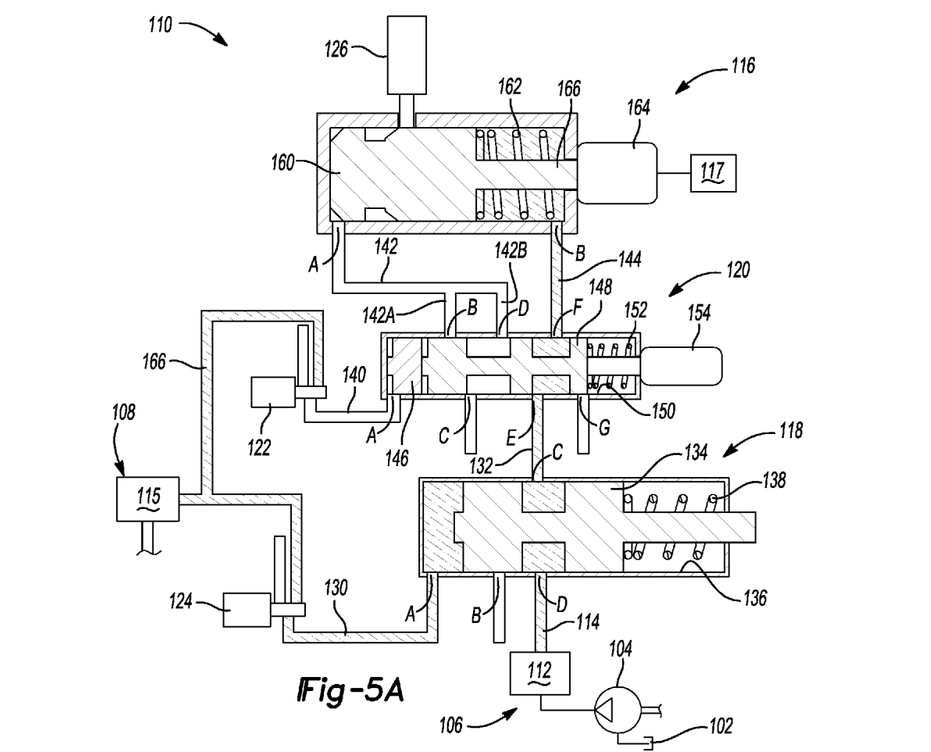
FIG. 5A is a diagram of a portion of a hydraulic control system according to the principles of the present invention in a fifth operating mode.
Figure 5B:
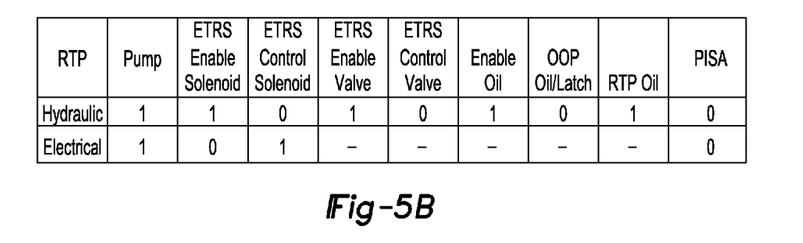
FIG. 5B is a table showing the operating state of components of the powertrain when in the fifth operating mode.

FIG. 5A shows the ETRS subsystem 110 in a return to park mode of operation and FIG. 5B presents a table indicating the on/off state or engagement/disengagement of various components of the powertrain 10 in the return to park mode. In FIG. 5B, a "0" indicates an off state or a disengaged state and a "1" indicates an on state or an engaged state. In the return to park state, the first control device 122 is closed and the main spool valve 148 moves to the out-of-park position. To break the latch, both the control devices 122, 124 are turned off hydraulically, so the output pressures from both these control devices 122, 124 are exhausted. The latch oil pressure from the out-of-park feed line 142 is also exhausted through exhaust port 120C. The return to park mode is then enabled by turning the second control device 124 on hydraulically. This will send the line pressure oil from the main supply line 114 to the park feed line 144. Pressurized hydraulic fluid from the main supply line 114 is communicated to the park feed line 144 by the control valve assembly 120 to hydraulically assist the piston 160 in moving to the park position.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission in a motor vehicle, the hydraulic control system comprising:
    a pressure regulator subsystem for providing a pressurized hydraulic fluid;
    an enablement valve assembly connected directly downstream of the pressure regulator subsystem and configured to selectively allow pressurized hydraulic fluid to communicate through the enablement valve assembly;
    a control valve assembly connected directly downstream of the enablement valve assembly and configured to selectively communicate the pressurized hydraulic fluid to one of a first port and a second port;
    a park servo assembly connected directly downstream to the first port and the second port of the control valve assembly and configured to control a park mechanism a fourth port;
    a first solenoid configured to control the enablement valve assembly; and
    a second solenoid configured to control the control valve assembly.

2. The hydraulic control system of claim 1 wherein the first port of the control valve assembly is connected to an out of park port in the park servo assembly and the second port of the control valve assembly is connected to a return to park port in the park servo assembly.

3. The hydraulic control system of claim 2 wherein the park servo assembly includes a park piston mechanically connected to a park mechanism, wherein the park piston is moveable between an out-of-park position and a park position, and wherein the out of park port communicates with an opposite side of the park piston than the return to park port.

4. The hydraulic control system of claim 1 further comprising a first position sensor for detecting an operating state of the control valve assembly.

5. The hydraulic control system of claim 1 further comprising a second position sensor for detecting an operating state of the park servo assembly.

6. The hydraulic control system of claim 1 wherein the first solenoid is a normally high, on/off solenoid.

7. The hydraulic control system of claim 1 wherein the second solenoid is a normally low, on/off solenoid.

8. The hydraulic control system of claim 1 further comprising a park inhibit solenoid assembly configured to latch the park servo assembly in an out of park position.

9. The hydraulic control system of claim 1 wherein the control valve assembly includes a shuttle valve and a control valve biased to a park position by a spring.

10. The hydraulic control system of claim 9 wherein the second solenoid communicates with the shuttle valve to move the shuttle valve and the control valve against the bias of the spring to an out of park position.

11. The hydraulic control system of claim 1 wherein the enablement valve assembly includes an enablement valve biased to a disable position by a spring.

12. The hydraulic control system of claim 11 wherein the first solenoid communicates with the enablement valve to move the enablement valve against the bias of the spring to an enabled position.

13. A hydraulic control system in a transmission of a motor vehicle, the hydraulic control system comprising:
  a pressure regulator subsystem for providing a pressurized hydraulic fluid;
  an enablement valve assembly having an inlet in communication with the pressure regulator subsystem, an outlet, a signal port, and an enablement valve moveable between a first position and a second position, wherein the enablement valve prohibits fluid communication from the inlet to the outlet when in the first position and allows fluid communication from the inlet to the outlet when in the second position;
  a control valve assembly having a first port directly hydraulically connected downstream to the outlet of the enablement valve assembly, a second port, a third port, a fourth port, a first valve, and a second valve, wherein the first valve is moveable between a first position and a second position and the first valve allows fluid communication between the first port and the third port when in the first position and the first valve allows fluid communication between the first port and the second port when in the second position, and wherein the fourth port communicates with an end of the second valve;
  a park servo assembly directly hydraulically connected downstream to the second and third ports of the control valve assembly, the park servo assembly configured to control a park mechanism;
  a first solenoid connected directly upstream to the signal port of the enablement valve assembly; and
  a second solenoid connected directly upstream to the fourth port of the control valve assembly.

14. The hydraulic control system of claim 13 wherein the second port of the control valve assembly is connected to an out of park port in the park servo assembly and the third port of the control valve assembly is connected to a return to park port in the park servo assembly.

15. The hydraulic control system of claim 14 wherein the park servo assembly includes a park piston mechanically connected to the park mechanism, wherein the park piston is moveable between an out of park position and a park position, and wherein the out of park port communicates with an opposite side of the park piston than the return to park port.

16. The hydraulic control system of claim 15 wherein the park servo assembly includes a park biasing member that biases the park piston to the park position.

17. The hydraulic control system of claim 16 wherein the control valve assembly includes a fifth port in communication with the second port of the control valve assembly and the out of park port of the park servo assembly to provide a feedback pressure on an end of the first valve when the first valve is in the second position.

18. The hydraulic control system of claim 17 wherein the first and second valves of the control valve assembly are biased to the first position by a first spring and the enablement valve is biased to the first position by a second spring.

19. The hydraulic control system of claim 13 wherein the first solenoid is a normally high, on/off solenoid.

20. The hydraulic control system of claim 13 wherein the second solenoid is a normally low, on/off solenoid.

* * * * *